UNITED STATES PATENT OFFICE.

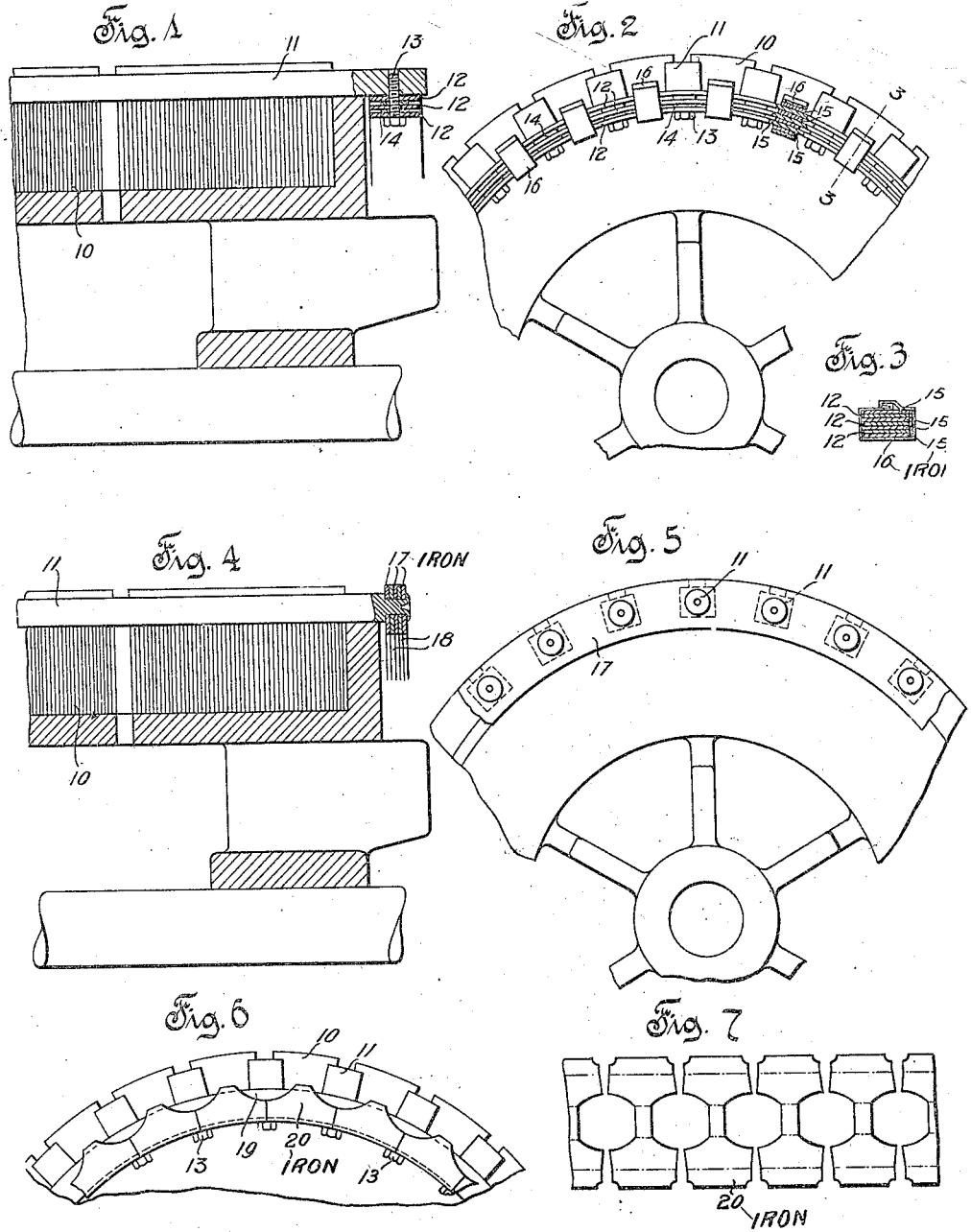

CHARLES E. LORD, OF MILWAUKEE, WISCONSIN, ASSIGNOR TO ALLIS-CHALMERS COMPANY, A CORPORATION OF NEW JERSEY.

INDUCTION-MOTOR.

991,626.

Specification of Letters Patent.   Patented May 9, 1911.

Application filed September 13, 1909.   Serial No. 517,499.

*To all whom it may concern:*

Be it known that I, CHARLES E. LORD, a citizen of the United States, residing at Milwaukee, in the county of Milwaukee and State of Wisconsin, have invented certain new and useful Improvements in Induction-Motors, of which the following is a full, clear, and exact specification.

My invention relates to induction motors.
In starting induction motors there is developed in the secondary circuit an electromotive force which is very high as compared with that developed when the motor is near synchronous speed. This is on account of the great slip at starting. The tremendous current which this electro-motive force tends to produce in the winding of the secondary member reacts on the primary circuit and gives the motor a very low starting torque.
This large secondary current can be avoided or lessened by making the impedance of the secondary circuit greater while the motor is starting than while the motor is running near synchronism. This greater impedance during starting has been obtained in the case of wound rotor motors by putting a variable ohmic resistance in the secondary circuit and cutting out such resistance as the motor approaches synchronous speed.
It is the object of my present invention to provide an arrangement, which is particularly applicable to induction motors of the squirrel cage type, though it may also be used with motors of the wound rotor type, in which the secondary circuit has a higher impedance when the motor is starting than when the motor is running, and in which the use of switching connections or sliding contacts is entirely avoided. This object is attained by partially or wholly incasing the short-circuiting conductors of the secondary circuit with magnetic material. Since the frequency of the current in the secondary circuit of an induction motor and the speed of such motor vary in inverse sense, it follows that because of this construction the short-circuiting conductors have a greater reactance and the secondary circuit of the motor a greater impedance when the motor is starting than when it is running at or near synchronism. The reactance of these short-circuiting conductors and therefore the impedance of the secondary circuit gradually diminish as the motor approaches synchronism.
The various novel features of my invention will appear from the description and drawings, and will be particularly pointed out in the claims.

Figure 1 is a partial longitudinal section of the rotor of an induction motor embodying my invention; Fig. 2 is a partial end view of the rotor of Fig. 1; Fig. 3 is an enlarged section on the line 3—3 of Fig. 2. Figs. 4 and 5 are views corresponding to Figs. 1 and 2 respectively and show a modification; Fig. 6 is an end view of an induction motor rotor showing a further modification; and Fig. 7 is a development of part of the magnetic shell of the modification of Fig. 6.

As usual, the rotor of the induction motor consists of a rotatable laminated core 10 in which are embedded the squirrel cage conductors 11, and the ends of the squirrel cage bars are all connected together by short-circuiting rings. But the short-circuiting rings, which may be made in a number of different forms, are different from those heretofore used.

In the arrangement shown in Figs. 1, 2, and 3, each short-circuiting ring consists of a plurality of conducting strips 12 which extend entirely around the rotor and are connected to one end of each of the squirrel cage bars 11, as by means of screws 13. The strips 12 are spaced from each other under each bar 11 by means of washers 14, which are preferably made of iron. At intervals along the strips 12, and preferably between each bar 11 and its neighbors, short strips 15 of magnetic material, preferably iron, are placed between the strips 12 and on the outside of the outer strips, and the whole is wrapped around by a strip 16 also preferably of iron. The strip 16 forms a shell inclosing the strips 12 and 15. If desired, the iron strips 15 and 16 may be insulated, as by shellac, from the conducting strips 12. By means of this construction each of the strips 12 is totally surrounded by iron between each pair of bars 11, and this magnetic shell around each strip 12 causes the reactance of the short-circuiting ring to be much larger at starting, when the frequency of the secondary circuit is high, than under running conditions, when such frequency is low. The impedance of the secondary circuit is therefore much higher when the motor is starting than when it is running near synchronism, and therefore the large secondary currents and their reaction upon the primary circuit are avoided and the motor has an excellent starting torque.

In the arrangement shown in Figs. 4 and 5, the short-circuiting rings consist of a plurality of metal strips to which the squirrel cage bars 11 of the rotor are preferably riveted as shown. Such riveting may well be accomplished by spinning over the end of each conductor 11. The alternate strips 17, preferably including the outside strips, are of iron or other magnetic material, and the remaining strips 18 are of some good conducting material. The strips 17 and 18 may be insulated from each other as by shellac. In this construction the strips 17 form a practically complete magnetic shell around such strips 18, and in consequence the secondary circuit of the motor has a comparatively high impedance at starting. As in the arrangement of Figs. 1, 2, and 3, in the arrangement of Figs. 4 and 5 the impedance gradually decreases as the speed of the motor increases.

In the arrangement shown in Figs. 6 and 7, the short-circuiting rings each consist of a bar 19 of conducting material surrounded by a shell 20 of magnetic material. This shell is preferably cut away under the squirrel cage conductors 11, to allow the bar 19 to engage such conductors. The shell 20 may conveniently be made of sheet iron, punched in the form illustrated in Fig. 7 and bent on the dot and dash lines around the conducting bar 19 as shown in Fig. 6. The shell 20 may be insulated from the bar 19, as by shellac. The short-circuiting rings in their entirety are fastened to the squirrel cage conductor bars 11 by means of screws 13, as in the arrangement of Figs. 1 and 2. The magnetic shells 20 around the conducting bars 19 give the secondary circuit of the motor a comparatively high impedance at starting, which impedance decreases as the motor approaches synchronous speed.

Other modifications may be made in my invention without departing from its spirit and scope, and all such I aim to cover in the following claims.

What I claim as new is:

1. In the secondary member of an induction motor, a core, a winding on the core, and short-circuiting conductors at least partly incased in iron carried by the winding.

2. In an induction motor rotor, a core, conductor bars embedded in said core, short-circuiting rings connecting the ends of said bars, said rings consisting of conducting material at least partially incased in magnetic material.

3. In an induction motor rotor, a core, conductor bars embedded in said core, short-circuiting rings connecting the ends of said conductors, said rings consisting of alternate strips of conducting and magnetic material.

4. In an induction motor rotor, a core, conductor bars embedded in said core, short-circuiting rings connecting the ends of said conductor bars, said short-circuiting rings comprising strips of conducting material between strips of magnetic material.

5. In an induction motor rotor, a core, conductor bars embedded in said core, short-circuiting conductors connecting the ends of said bars, and shells of magnetic material around and supported by said short-circuiting conductors.

6. In an induction motor rotor, a core, conductor bars embedded in said core, short-circuiting rings connecting the ends of said bars, said rings comprising a plurality of strips some of which are of magnetic material.

7. In an induction motor, a rotor core, squirrel cage bars therein, short-circuiting rings connecting corresponding ends of the bars, and magnetic material carried by the short-circuiting bars and in close proximity thereto.

In testimony whereof I affix my signature, in the presence of two witnesses.

CHARLES E. LORD.

Witnesses:
CHAS. L. BYRON,
ROB. E. STOLL.